United States Patent [19]

Mead et al.

[11] 4,071,662
[45] Jan. 31, 1978

[54] LITHIUM-IODINE BATTERY HAVING COATED ANODE

[75] Inventors: Ralph T. Mead, Kenmore; Wilson Greatbatch, Clarence; Frank W. Rudolph, Depew, all of N.Y.

[73] Assignee: Wilson Greatbatch Ltd., Clarence, N.Y.

[21] Appl. No.: 647,002

[22] Filed: Jan. 7, 1976

Related U.S. Application Data

[62] Division of Ser. No. 525,051, Nov. 19, 1974, Pat. No. 3,957,533.

[51] Int. Cl.² ............................................. H01M 2/02
[52] U.S. Cl. .................................. 429/178; 429/185; 429/218
[58] Field of Search ............... 136/83 R, 100 R, 20, 136/137; 429/102, 101, 191, 212, 218, 178, 185; 427/402

[56] References Cited

U.S. PATENT DOCUMENTS

| | | |
|---|---|---|
| 3,660,163 | 5/1972 | Moser .............................. 136/83 R |
| 3,660,164 | 5/1972 | Hermann ........................... 429/191 |
| 3,773,557 | 11/1973 | Mead .......................... 136/83 R X |
| 3,817,791 | 6/1974 | Greatbatch et al. .............. 136/83 R |
| 3,957,533 | 5/1976 | Mead et al. ....................... 136/83 R |

Primary Examiner—Charles F. LeFevour
Attorney, Agent, or Firm—Christel & Bean

[57] ABSTRACT

A lithium-iodine cell comprising a cathode including a charge transfer complex of an organic donor component and iodine, an anode including a lithium element having a surface operatively contacting the charge transfer complex material, and a coating on the lithium surface of an organic electron donor material, preferably but not necessarily the organic donor component of the charge transfer complex. The organic electron donor material preferably comprises polyvinyl pyridine polymer and in particular two-vinyl pyridine polymer. A solution of two-vinyl pyridine polymer in benzene is brushed onto the anode lithium surface and then exposed to a desiccant. A number of coatings preferably are applied successively to provide a resulting or finished coating of increased thickness.

12 Claims, 3 Drawing Figures

LITHIUM-IODINE BATTERY HAVING COATED ANODE

This is a division of application Ser. No. 525,051 filed Nov. 19, 1974, now U.S. Pat. No. 3,957,533.

BACKGROUND OF THE INVENTION

This invention relates to the conversion of chemical energy to electrical energy, and more particularly to a new and improved construction for lithium-iodine cells and method of making the same.

One area of use of the present invention is in providing electrical power safely to inacessible devices in the human environment, for example to an implanted cardiac pacemaker, although the principles of the invention can be variously applied. Several types of batteries for implantable cardiac pacemakers have been proposed but heretofore all have certain limitations. Recently a lithium-iodine cell has been proposed which advantageously has an open circuit voltage about twice that of the mercury cell, does not generate gas during operation, and has a non-corrosive electrolyte.

Several problems can arise in the manufacture or assembly of lithium-iodine cells. A cell has been proposed including a lithium anode and a cathode comprising a charge transfer complex of an organic donor component and iodine. In a recently developed method for making such a cell, the organic-iodine complex is introduced to a casing, which includes the remaining cell components, in the form of a pourable tar-like or viscous substance which may be heated to an elevated temperature. Observation of such cells over prolonged tests have indicated that in some instances the cell impedance and the rate of impedance buildup on discharge is quite variable. In other instances an abnormally high impedance buildup has been observed.

SUMMARY OF THE INVENTION

It is, therefore, an object of this invention to provide a new and improved construction for a lithium-iodine cell and a method of making the same.

It is a further object of this invention to provide a new and improved anode construction for a lithium-iodine cell and a method of making the same.

It is a more particular object of this invention to provide a lithium-iodine cell and anode construction having a relatively low cell impedance.

It is a more particular object of this invention to provide a lithium-iodine cell and anode construction having a relatively constant long-term cell impedance.

It is a further object of this invention to provide such a lithium-iodine cell and anode construction which can be manufactured relatively easily and economically.

The present invention provides a coating on the operative surface of the anode of a lithium-iodine cell wherein the cathode contains a charge transfer complex of an organic donor component and iodine. The coating material is an organic donor component material, preferably but not necessarily the organic donor of the charge transfer complex, which preferably is polyvinyl pyridine polymer and in particular two-vinyl pyridine polymer. The coating results in a greater utilization of the surface of the anode lithium element by the cathode material and a reduction in cell impedance, and these desirable results can be enhanced by increasing the coating thickness.

The foregoing and additional advantages and characterizing features of the present invention will become clearly apparent from a reading of the ensuing detailed description together with the included drawing wherein:

BRIEF DESCRIPTION OF THE DRAWING FIGURES

DETAILED DESCRIPTION OF THE ILLUSTRATED EMBODIMENT

A lithium-iodine cell according to the present invention can include a hollow casing, for example rectangular in shape, for receiving the cell components through one open end thereof which after assembly of the components is closed and sealed in a suitable manner. The casing is of a material which is non-reactive with iodine, preferably an epoxy material which has been suitably cured, and is molded or otherwise formed to be of an integral construction. The cell includes anode means including an element of lithium suitably positioned within the casing, a cathode current collector also within the casing and spaced from the anode means, and a material in the form of a charge transfer complex of an organic donor component and iodine within the casing and in operative contact with the lithium element of the anode means and with the cathode current collector. Suitable electrical conductor means extend from the anode means and from the cathode current collector out through the casing for connection to an external electrical circuit for use.

Figure 1:
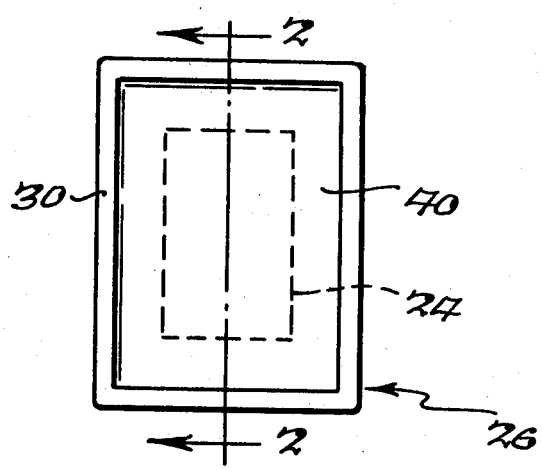
FIG. 1 is an elevational view of an anode for a lithium-iodine cell according to the present invention and showing the coated surface of the anode.
Figure 2:
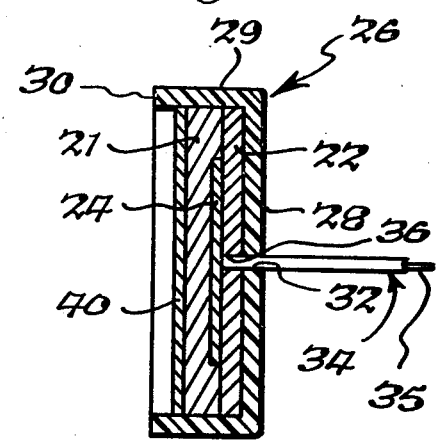
FIG. 2 is a sectional view taken about on line 2—2 of FIG. 1.

FIGS. 1 and 2 illustrate an anode means according to the present invention for a lithium-iodine cell. The anode means comprises a first lithium element or plate 21 and a second lithium element or plate 22, the two elements being pressure bonded together and against an anode current collector 24 as shown in FIG. 2. The lithium elements 21, 22 with current collector 24 sandwiched therebetween are pressure bonded within an anode holding means 26 which is shaped to receive the lithium members 21, 22 in a manner exposing a surface of lithium element 21 for operative relationship with the iodine-containing cathode material in a cell in which it is placed. In this exemplary form of holding means 26, there is a substantially planar face portion 28 and a continuous peripheral rim portion 29 extending from face portion 28 and terminating in an edge 30. Edge 30 is disposed in a plane substantially parallel to but spaced from a plane including the exposed face of lithium element 21 for a purpose to be described. Holding means 26 is of a material which does not exhibit electronic conduction when exposed to iodine and a material found to perform satisfactorily is available commercially under the name Halar, a trademark of the Allied Chemical Company. As shown in FIG. 2 face portion 28 of holding means 26 is provided with a small slot or aperture 32 of a size permitting an electrical conducting means 34 to extend therethrough. The anode current collector 24 can comprise an expanded zirconium or nickel element of no. 12 mesh having a thickness of about 5 mils. Conducting means 34 comprises an electrically conducting wire or strip 35 connected at one end to collector 24 and surrounded by electrical insulation of a material which does not exhibit electronic conduction when exposed to iodine. Conducting means 34 extends through a slot or aperture 36 provided in lithium plate 22 for making electrical connection to the lithium anode. Holding means 26 thus serves as a frame or support for the sandwiched arrangement of lithium plates 21, 22 and current collector 24.

In accordance with the present invention, the surface of the lithium anode element adapted to be operatively associated with the cathode in the battery is provided with a coating 40 of an organic donor component material. In particular, the material of coating 40 is an organic electron donor material of the group of organic compounds known as charge transfer complex donors. The material of coating 40 can be the organic donor used in preparing the charge transfer complex of the cathode material, but other materials can be employed as will be explained presently. A preferred material for coating 40 is polyvinyl pyridine, and is applied preferably in multiple coatings or layers in a manner which will be described presently.

The anode shown in FIGS. 1 and 2 is formed according to the following method. The material of holding means 26, in addition to not exhibiting electronic conduction when exposed to iodine, also should have the characteristic of being pressure bondable to lithium. Lithium plate 22 is placed in holding means 26 so as to be fitted in rim 29 wherein the aperture 36 in plate 22 is in registry with aperture 32 of face portion 28. Anode current collector 24 and conductor 34 are joined beforehand, and the free end portion of conductor 34 is passed through the aligned apertures 36, 32 until the anode current collector 24 is in contact with the exposed face of plate 22. Then plate 21 is placed in contact with current collector 24 and fitted within rim portion 29 whereupon the anode assembly is pressed together with a suitable force, for example about 3,000 pounds, causing the assembly to be bonded together. As a result, lithium plates 21, 22 are bonded together in a manner sealing the current collector 24 between the plates 21, 22 and the peripheral juncture or edges of plates 21, 22 are sealed by rim 29 of holding means 26.

In accordance with the present invention, coating 40 is applied to the exposed surface of lithium plate 21 in the following manner. A solution of two-vinyl pyridine polymer in anhydrous benzene is prepared. The two-vinyl pyridine is readily commercially available. The solution is prepared with 2-vinyl pyridine present in the range from about 10% to about 20% by weight with a strength of about 14% by weight of 2-vinyl pyridine being preferred. While two-vinyl pyridine, four-vinyl pyridine, and 3-ethyl 2-vinyl pyridine can be used, 2-vinyl pyridine is preferred because of its more fluid characteristics. When the solution is prepared at a strength below about 10% the resulting coating can be undesirably too thin, and when the solution is prepared at a strength greater than about 20% the material becomes difficult to apply. The solution is applied to the exposed surface of lithium plate 21 in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular, the coated anode is placed in a chamber with barium oxide solid material for a time sufficient to remove the benzene, which can be in the neighborhood of 24 hours. The foregoing procedure can be repeated a number of times to provide a corresponding number of layers or coatings thereby resulting in a final coating of increased thickness. The advantages provided by a thicker coating will be described in detail presently. While it is preferred to apply a coating, expose to desiccant and then repeat these steps for the desired number of times, it is believed that the desired number of coatings first can be applied followed by a single exposure to desiccant. In any event, the resulting or dried coating is of increased thickness, being a composite of a number of coatings or layers successively applied.

Figure 3:
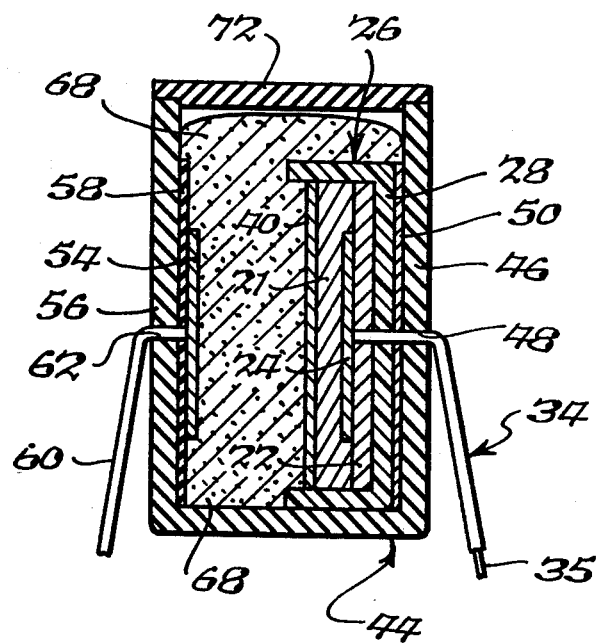
FIG. 3 is a sectional view of a lithium-iodine cell according to the present invention.

FIG. 3 illustrates one form of a completed lithium-iodine cell having the anode means constructed according to the present invention. The cell includes a hollow casing 44, and the anode means is positioned within casing 44 in the following manner. One sidewall 46 of the casing is provided with a slot or aperture 48 of a size permitting conductor means 34 to extend therethrough. The anode means is moved into position within casing 44, and at the same time conductor means 34 is drawn through slot 48 until face portion 28 of the holding means 26 is almost in contact with the inner surface of casing wall 46. A suitable cement 50 is applied to the outer surface of face portion 28 and to the corresponding portion of the inner surface of wall 46, whereupon conductor means 34 is drawn further through slot 48 and the two surfaces are brought into contact with each other. One form of cement 50 found to perform satisfactorily is commercially available from Techni-Tool Inc. under the designation Permabond 101.

The cell according to the present invention further comprises electrical conductor means connected to the cathode of the cell and extending through casing 44. In preferred form, a cathode current collector 54 in the form of a thin sheet or strip of zirconium or nickel foil is positioned within casing 44 and spaced from the inner surface of the opposite side wall 56 of casing 44 by a spacer member 58 of Teflon or similar material. An electrical conductor 60 comprising a wire or strip covered or coated with insulation similar to conductor 34 is connected at one end to collector 54 and extends through a slot or aperture in spacer member 58 and a corresponding slot or aperture 62 in casing side wall 46 for providing an externally available electrical connection to the cathode current collector 54. Collector 54 is positioned adjacent the inner surface of casing wall 56, and spacer member 58 acts like a spring to urge the cathode current collector 54 into contact with the cathode material during the lift of the cell. As shown in FIG. 3, cathode current collector 54 is located in casing 44 spaced from and opposite to the anode assembly.

The cell of the present invention is completed by the provision of cathode means 68 comprising iodine-containing material within casing 44. Cathode means 68 comprises a charge transfer complex of an organic material and iodine. The organic material should be an electron donor and can be any organic compound having a double bond or an amine group. An electron donor gives the iodine sufficient conductivity for proper cell operation. A preferred organic material is 2-vinyl pyridine polymer. The cathode material 68 is prepared by heating the organic material, i.e. 2-vinyl pyridine, to a temperature greater than the crystallation temperature of iodine and then adding iodine to the heated material. The amount of iodine should be greater than about 50 percent by weight of the resulting mixture so that enough iodine is available in the cathode material 68 to provide sufficient conductivity for proper cell operation.

The resulting mixture is a viscous, flowable substance which is introduced to casing 44 in the following manner. Casing 44 is held either by hand or in a fixture in an upright position whereupon material 68 is poured into casing 44 through the open top thereof. The material 68 fills the interior of casing 44 in an amount sufficient to contact the coating 40 on the outer surface of lithium plate 21 as well as the cathode current collector 54. Then the casing 44 is sealed at the top such as by means of a lid member 72 of epoxy or similar material which is placed on and cemented to the top peripheral edge of casing 44.

The lithium-iodine cell according to the present invention operates in the following manner. As soon as the iodine-containing cathode material 68 placed in casing 44 operatively contacts lithium plate 21, a lithium-iodine electrolyte begins to form at the interface and an electrical potential difference exists between the anode and cathode electrical leads. The exact mechanism by which the iodine-containing cathode material 68 and lithium plate 21 come into operative contact through coating 40 is not known. The mechanism could involve migration of iodine atoms from material 68 through coating 40 to plate 21 or migration of lithium atoms from plate 21 through coating 40 to material 68.

The present invention also is applicable to an anode for a lithium-iodine cell wherein two surfaces of the lithium anode are operatively exposed to the iodine-containing cathode material. In particular, instead of the cup-shaped holding means 26 there would be provided a ring-like frame member sealingly embracing the peripheral edges of lithium plates 21, 22 so that the outer surface of each lithium plate is exposed. The frame or holding means would be of material identical to that of holding means 26, and the anode conductor 34 would extend from the current collector between the lithium plates out through the frame. Two coatings, each identical to coating 40, are applied to the corresponding two exposed lithium surfaces.

One advantageous result provided by the cell of the present invention wherein the anode is provided with coating 40 is that the impedance of the cell is reduced to about one-half the impedance of a cell of similar construction but without the pre-coated anode. This desirable reduction in cell impedance is believed to result from a better and improved electrically effective contact area between the cathode material 68 and the anode lithium element. In particular, when iodine-containing cathode material at an elevated temperature is poured into a cell and into contact with an uncoated lithium surface, there can be some immediate recrystallization of iodine on the lithium surface thereby blocking or preventing operative contact at that point between the lithium element and the complex of organic material and iodine. Coating 40 serves as a protective coating to prevent this problem, functioning as a buffer between the pure lithium plate and the relatively hot cathode material 68 as it is poured into the cell casing. This activates perhaps three times as much anode area as compared to pouring hot cathode material directly on the anode. As hot cathode material cools quickly directly on the anode, iodine crystals seem to block large areas of the anode, permanently incapacitating them. The coating 40 of the present invention, on the other hand, protects the anode while iodine later applied in complexed form slowly penetrates through the coating 40. The cell of the present invention thus provides a greater utilization of the surface of the anode lithium element by the cathode material. In addition, the protective coating 40 permits a relatively longer handling time during construction of the cell prior to pouring the hot cathode material 68.

A related advantage is that the cell impedance remains relatively constant over prolonged discharge. In particular, cells according to the present invention were observed to exhibit relatively small percentage or proportional voltage drops over long term periods of test such as about 12 months. The provision of coating 40 maximizes the surface area of lithium element 21 which is effectively contacted by cathode material 68 thereby minimizing or eliminating variation in the electrically effective contact area with the lithium anode by the charge transfer complex. As a result, the cells according the present invention advantageously exhibit good long-term performance.

The following test results are believed to illustrate further the advantages derived from the cell of the present invention. Impedance measurements were made with a 100 kilohm resistance connected in parallel with the cell under test. A number of cells were tested and the average of readings was calculated. In particular, measurements taken from 32 cells each with an uncoated anode under prolonged test for a period of 11.6 months yielded an average cell impedance of 611.84 ohms with standard deviation of 145.37 ohms and an average cell voltage of 2.782 volts with a standard deviation of 0.00567 volts. Measurements taken from 47 cells each having a coated anode according to the present invention under prolonged test for a period of 12.2 months yielded an average cell impedance of 117 ohms with a standard deviation of 40.3 ohms and an average cell voltage of 2.782 volts with a standard deviation of 3.46 millivolts. Thus the impedance of cells having a coated anode according to the present invention is significantly lower than the impedance of cells having an uncoated anode.

Further reduction in cell impedance was observed to resul from an increase in coating thickness. The following quantities were calculated from tests on a number of cells under prolonger test for a period of 13.2 months wherein cells having different anode coating thicknesses were compared as follows:

|  | Average Impedance | Standard Deviation | Average Voltage | Standard Deviation |
|---|---|---|---|---|
| 1 coat | 123.4 ohms | 15 ohms | 2.786 volts | 0.0011 volts |
| 2 coats | 43 ohms | 3.5 ohms | 2.788 volts | 0.00045 volts |
| 3 coats | 45 ohms | 6.0 ohms | 2.789 volts | 0.0021 volts |
| 3 coats | 35 ohms | 2.2 ohms | 2.790 volts | 0.0005 volts |

Impedance measurements were made with a 100 kilohm resistance connected in parallel with the cell under test, and an average was calculated from readings obtained from the number of cells tested. Thus a substantial reduction in cell impedance from 123.4 ohms to 43 ohms results when the coating thickness is increased from one coat to two coats. A further reduction in cell impedance was observed when the coating thickness was increased to three coats. In this connection, while the one set of data for three coats gave an average cell impedance of 45 volts, with one unit removed from the set an average cell impedance of 35 volts was derived. The foregoing establishes that having coating 40 of increased thickness advantageously results in a lower cell impedance on prolonged test.

The final or resulting thickness of the anode coating was found to be dependent not only on the number of coats or layers applied but also on the strength of the polyvinyl pyridine in benzene solution. In particular, aluminum plates were brush coated with 5%, 10% and 20% solutions of 2-vinyl pyridine in anhydrous benzene. Thickness measurements using eddy current measurements were taken of the dried coatings, and the values listed below are averages computed from 10 readings:

| Sample Number | Coating | Average Thickness In Microinches |
| --- | --- | --- |
| 1 | 1 coat, 5% solution | 60 |
| 2 | 2 coats, 5% solution | 170 |
| 3 | 1 coat, 10% solution | 190 |
| 4 | 2 coats, 10% solution | 340 |
| 5 | 1 coat, 20% solution | 380 |
| 6 | 2 coats, 20% solution | 1175 |

Thus the thickness of the dried coating is determined by the number of coats and the strength of the solution, with a greater concentration providing a thicker coating.

Another advantage provided by the cell of the present invention is that the iodine content of cathode material 68 can be increased thereby advantageously increasing the energy density of the cell. In particular, the material 68 can be prepared in the usual way as described above by heating the organic material, i.e. 2-vinyl pyridine, to a temperature greater than the crystallization temperature of iodine and then adding iodine to the heated material. Iodine usually is added in an amount providing a weight ratio of about 10.1 of iodine to organic material. With the cell of the present invention additional iodine can be added to the mixture to increase the weight ratio to 15:1 or greater of iodine to organic material. Due to the protective coating 40 applied to the anode lithium surface, the greater amount of iodine in the cathode material 68 will not recrystallize on the lithium surface as the heated material 68 is poured into the cell. As a result, the energy density of the cell can be increased while at the same time maintaining an improved electrically effective contact area between the cathode material 68 and the anode lithium element.

As described in detail above, with the cathode material 68 comprising a charge transfer complex of 2-vinyl pyridine polymer and iodine, coating materials 40 found to perform satisfactorily are poly-2-vinyl pyridine, poly-4-vinylpyridine and poly-3-ethyl-2-vinyl pyridine. The foregoing materials of coating 40 are organic electron donor materials of the group of organic compounds known as charge transfer complex donors. These compounds also are members of the chemical classes of polycyclic aromatic compounds, heterocyclic compounds containing nitrogen, and polyvinyl compounds in which a heterocyclic nitrogen moiety is incorporated as a side chain or substituent.

It is therefore apparent that the present invention accomplishes its intended objects. While a single embodiment of the present invention has been described in detail, this is for the purpose of illustration, not limitation.

We claim:

1. An anode for a lithium-iodine cell wherein the cathode contains a charge transfer complex of an organic donor component and iodine, said anode comprising:
   a. a lithium element having a surface adapted to be operatively associated with the cathode in the cell; and
   b. a protective coating on said lithium anode surface consisting essentially of an organic electron donor component material, said protective coating preventing recrystallization of iodine on said lithium anode surface when the charge transfer complex contacts said lithium anode surface through said protective coating so as to maximize the area of said lithium anode surface operatively contacted by the charge transfer complex.

2. An anode according to claim 1, wherein said coating is of the organic donor component material of said charge transfer complex material.

3. An anode according to claim 1, wherein said coating is of polyvinyl pyridine polymer.

4. An anode according to claim 1, wherein said coating is of two vinyl pyridine polymer.

5. An anode according to claim 1, wherein said coating is a composite of a number of coatings.

6. An anode according to claim 1, wherein said anode comprises a pair of lithium elements bonded together and against a current collector in a manner sealing said current collector between said elements, said current collector having an electrical lead-connected thereto and extending from said lithium elements.

7. An anode according to claim 1, wherein the ratio of iodine to organic donor component by weight in said charge transfer complex is greater than 10:1.

8. An anode according to claim 6, wherein said anode further comprises a frame member continuously surrounding the peripheral edges of said lithium elements in a manner sealing said edges, said electrical lead extending through said frame member.

9. A method of making an anode for use in a lithium-iodine cell wherein the cathode contains a charge transfer complex of an organic donor component and iodine comprising the steps of:
   a. providing an anode including a lithium element having a surface adapted to be operatively associated with the cathode in the cell; and
   b. applying a protective coating to said anode surface, said coating consisting essentially of an organic electron donor component material.

10. A method according to claim 9, wherein said coating is of the organic donor component material of said charge transfer complex.

11. A method according to claim 9, wherein said coating is applied successively to provide a coating of increased thickness.

12. A method according to claim 9, wherein said step of applying said coating comprises:
   a. preparing a solution of polyvinyl pyridine in anhydrous benzene;
   b. applying said solution to said anode surface; and
   c. exposing the coated anode surface to a desiccant in a manner sufficient to remove benzene from the coating.

* * * * *